Figure 3:
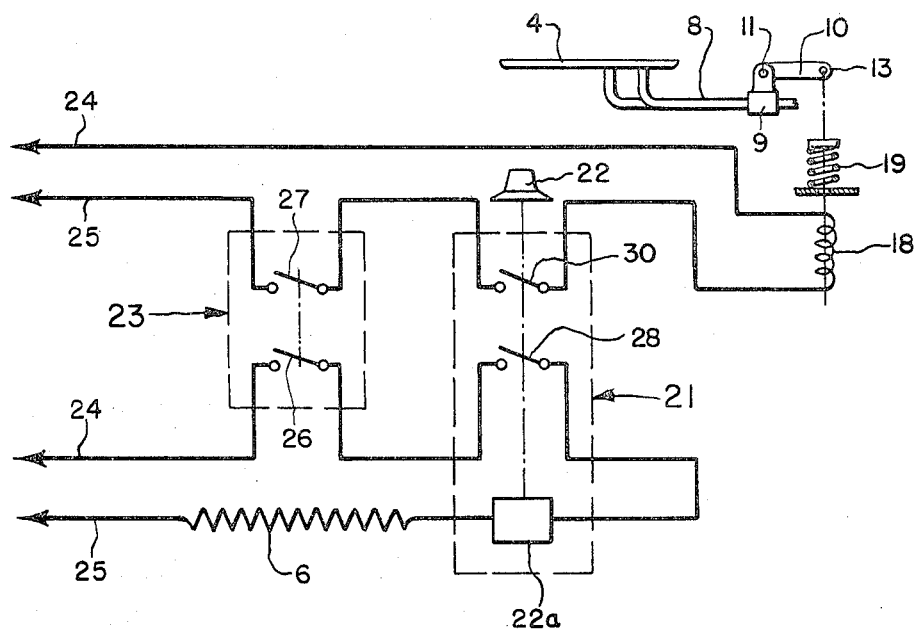

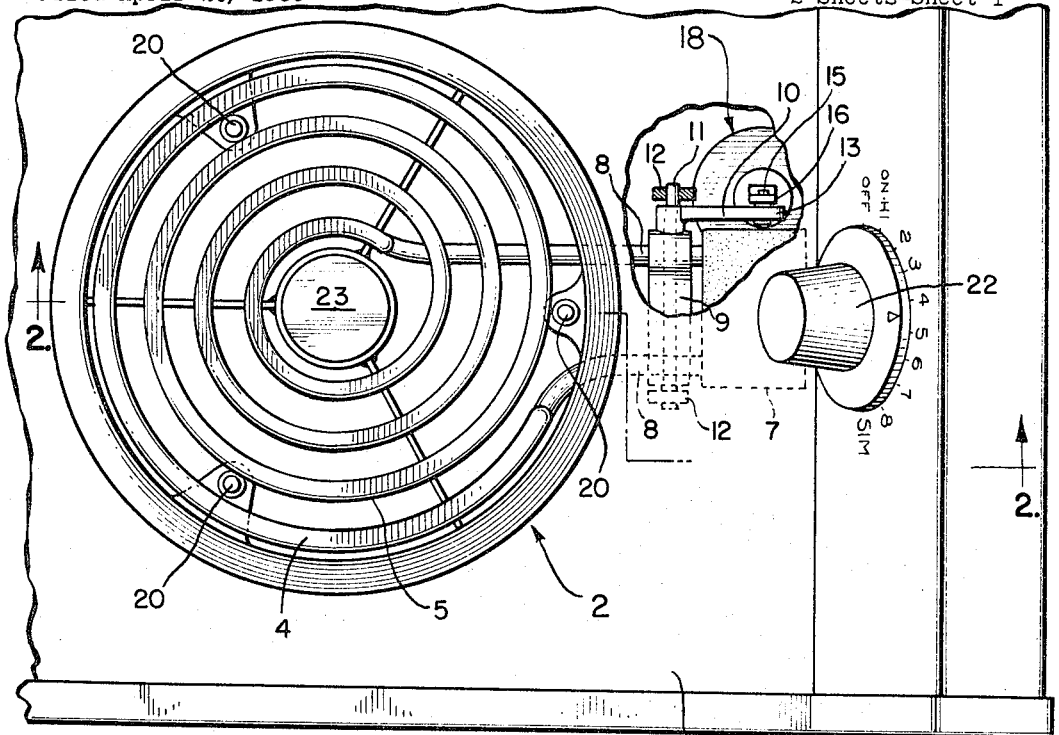

INVENTOR.
Peter Nowosielski
BY
Attorney

United States Patent Office

3,384,736
Patented May 21, 1968

3,384,736
SURFACE HEATING DEVICE
Peter Nowosielski, Chicago, Ill., assignor to General
Electric Company, a corporation of New York
Filed Apr. 29, 1966, Ser. No. 546,446
6 Claims. (Cl. 219—456)

This invention relates to surface heating devices, and more particularly to such devices which provide a hot surface on which a cooking vessel may be placed so that the contents of the vessel are then cooked primarily by conduction of heat from the supporting surface to the vessel.

There are many advantages to cooking by the use of a hot surface which transfers heat to a cooking vessel by conduction, as opposed to the use of, for example, an open flame. For instance, there is no danger of extinguishing the flame, nor are there products of combustion. In the past there has, however, been the aspect, which some may consider a drawback, that the heating surface remains hot because of thermal inertia even after the energization of the heating means has stopped. As a result it takes a more experienced operator to make sure that overheating or boiling over do not occur occasionally.

In concurrently filed application Ser. No. 546,445 Linger, assigned to the assignee of my present invention, there is described a remedy for this situation: the cooking vessel is automatically lifted when heat energy ceases to be supplied to the cooking surface. This insures that substantially all heat ceases to be transmitted to the cooking vessel as soon as desired, regardless of whether thermal inertia causes residual heat to be present in the cooking surface.

It is an object of my invention to provide an improvement—entirely described herebelow—to the aforesaid Linger invention whereby the separation of the cooking vessel from the heating surface is obtained in a more simple and effective manner.

It is a further object of my invention to provide a structure having the advantages described above wherein the cooking vessel remains substantially stationary, so that there is no tendency for substances within the vessel to be shaken or jolted.

In carrying out my invention in one form thereof, I provide a surface heating device wherein there is a generally flat upper surface intended to contact a cooking vessel for heating primarily by conduction. Suitable means are provided for causing heating of this upper surface, with an on-off system controlling the operation of the heating means so as to determine whether energy is to be supplied for heating purposes or not. Independently of this upper surface, support means for supporting the vessel are provided extending through appropriate openings in the flat upper surface. My invention contemplates the provision of means to raise and lower the upper surface a relative small distance when the on-off system is in its "on" and "off" conditions respectively. The upper surface is raised against the bottom of the vessel supported on the independent means when the heat energy is turned on, and is lowered away from the vessel supported on the independent support means when the heat is turned off. This permits the flow of heat from the surface to the vessel by conduction to be stopped immediately, and virtually completely, without any movement of the cooking vessel being required.

The subject matter which I regard as my invention is particularly pointed and distinctly claimed in the concluding portion of this specification. My invention, however, both as to organization and method of operation, together with further objects and advantages thereof, may best be understood by reference to the following description taken in conjunction with the accompanying drawings.

Figure 4:
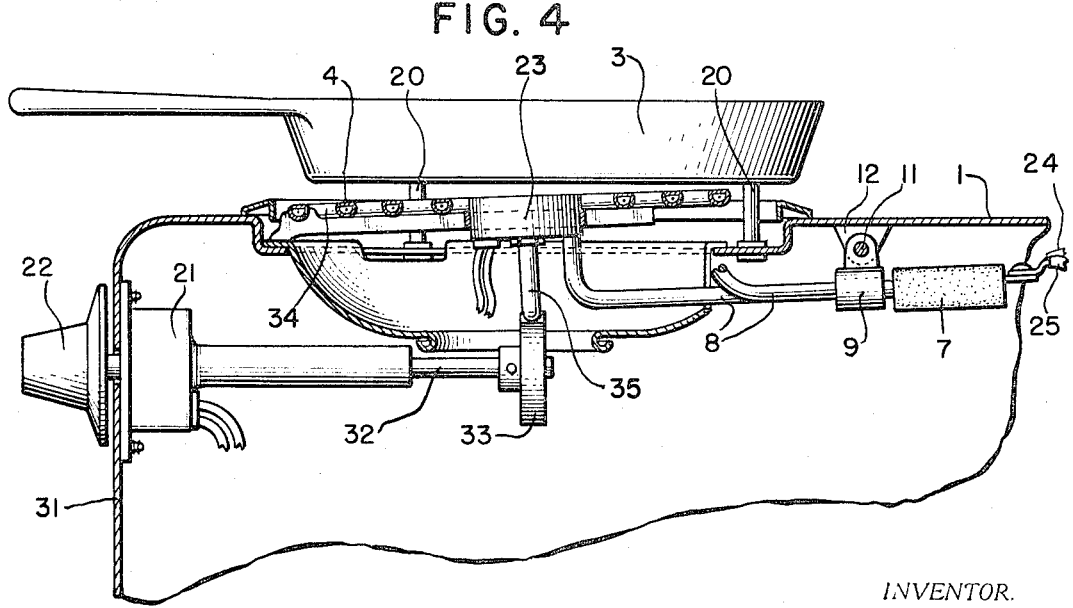

In the drawings,
FIGURE 1 is a plan view illustrating a surface heating device incorporating my invention;
FIGURE 2 is a view along line 2—2 in FIGURE 1;
FIGURE 3 is a simplified electrical diagram illustrating the control system for the electrical resistance heating unit of a surface heating device; and
FIGURE 4 is a side elevational view illustrating a second embodiment of my invention.

Referring now to FIGURES 1 and 2, there is shown a surface section 1 of a conventional domestic electric range wherein several surface heating devices such as the one shown at 2 may be provided in order to effect cooking. The cooking is effected by conduction of heat to cooking vessels, such as the one shown at 3, which may be placed upon the surface 4 of heating device 2. One conventional means for forming the heating surface is to provide a spiral sheathed tubular heater which includes, as shown in FIGURE 2, an outer sheath 5 and an inner resistance heater coil 6 which are maintained in spaced relation by a suitable filling of thermally conductive electrically non-conductive material such as magnesium oxide. The upper surface of sheath 5 provides the surface 4 in a generally horizontal plane. The terminals (not shown) of the heater may be connected through a conventional terminal block 7 to a suitable source of power, as will be further explained hereinbelow.

The upper surface 4 provided by the sheath 5 provides a substantial amount of contact area with the cooking vessel 3 when the cooking vessel and the surface 4 are in engagement. In this manner, when coil 6 is energized, there is a very substantial transfer of heat by conduction from the upper surface 4 of the heating element to the cooking vessel 3. It will, of course, be understood that the specific structure of the means for achieving the heating surface 4 is described only for purposes of illustration, and that heating surfaces obtained in other ways may readily be used. For instance, another commercially used means for providing a surface which cooks primarily by conduction is to form the entire surface of a single smooth piece of material with a heating structure being provided therebelow, so that the bottom of the cooking vessel contacts a substantially smooth surface rather than one having the spiral appearance best seen in FIGURE 1.

End portions 8 of sheath 5 are supported in portion 9 of a member 10 pivotally secured by a pin 11 to flange 12 mounted to the underside of surface section 1. Member 10 includes an arm 13 having a slot 14 in which a pin 15 is movably secured. Pin 15 is provided at the top of a member 16 rigidly secured to the plunger 17 of a solenoid member generally shown at 18. The solenoid member is provided with a spring 19 which biases it to the position shown; when the solenoid is energized, the electromagnetic force overcomes spring 19, and plunger 17 is pulled into the solenoid. Normally, spring 19 biases member 16 upwardly; when the solenoid is energized, member 16 is pulled downwardly, and as a result of the engagement of pin 15 in slot 14 the member 10 is then pivoted clockwise about pin 11.

Since sheath 5 of the heating unit is rigidly secured to member 10 by portion 9 thereof, energization of solenoid 18 moves upper surface 4 from the position in which it is shown upwardly to a horizontal plane in which it lies flat against the base of cooking vessel 3. The cooking vessel 3 is supported in a horizontal plane formed by the tops of pins 20. These pins are rigidly secured to the surface section 1, being fastened from beneath the heating unit so as to extend up through appropriate openings in surface 4. In the structure shown, these openings are provided by the spaces between adjacent turns of the spiral.

Thus, vessel 3 is supported in the position shown in FIGURE 2; upper surface 4 may be moved from the position shown, in which it is spaced from vessel 3, upwardly to lie flat against the bottom of the vessel.

Energization of heating coil 6 is achieved through a conventional on-off system such as a switch mechanism 21 controlled by manually operable member 22. Conventionally, such switch mechanism is of the type which permits various levels of energization of coil 6 so that various heating rates may be provided. For the sake of simplicity, switch 21 has been shown in FIGURE 3 as a structure which achieves heat variation through a conventional oscillator mechanism 22a, of the type in common usage. Such mechanisms operate by varying the proportion of circuit-completion time to the proportion of circuit-open time so as to control the amount of energy used to heat coil 6. It will be understood that other and more sophisticated approaches may be used and are intended to be included within the scope of my invention.

Also shown in FIGURES 1 and 2 is a thermal sensing device 23 which may be of any conventional construction, as provided in many commercially available domestic ranges. Device 23 functions to shut off the energization of coil 6 when it senses a predetermined temperature of the cooking vessel 3. The specific switches controlled by manual control structure 21 and thermally responsive control structure 23 are shown in a simplified and schematic manner in FIGURE 3.

Coil 6 may be connected, through terminal block 7, to conductors 24 and 25 which are adapted to be connected across a source of 240 volts alternating current power. The thermal element 23 may include a switch 26 which is in series with coil 6 and directly controls the energization thereof, and may further include a switch 27 in series relationship with solenoid 18 across a source of 120 volts A–C power. Manual control structure 21, as controlled by knob 22, may include a switch 28 in series with switch 26 and with coil 6, a connection to oscillating mechanism 22a for permitting variation of the heat in the relatively simple manner previously described, and a switch 30 in series with switch 27 and solenoid 18.

It can readily be seen that when switches 26 and 28 are closed, and knob 22 is adjusted to provide the desired setting for mechanism 22a, then energization on the selected basis across the 240 volt source will occur for the heating element 6. Opening of either of switches 26 or 28 by, respectively, temperature or manual operation will stop the energization of coil 6.

Switches 26 and 27 are ganged together so that, when the heat is turned off solenoid 18 is also deenergized to separate the bottom of the cooking vessel 3 from the heat conducting surface 4 as previously described. Similarly, switches 28 and 30 are ganged together so that if the energization of coil 6 is terminated manually by opening of switch 28, then switch 30 also opens to deenergize coil 18, and cause separation of surface 4 from pan 3 by virtue of the lowering of surface 4 in a vertical direction below the plane formed by the tops of pins 20. A separation of ⅛ inch has been found highly effective for the desired purpose.

In either event, the point is that when coil 6 is no longer energized, the vertical spacing of the cooking vessel from the cooking surface prevents any residual heat from being conducted into the vessel. Further, the structure does not involve any movement of the cooking vessel itself; this permits the structure of solenoid 18 to be exceedingly simple and properly tailored to its job because it is always the same predetermined load, that is, the heating unit, which is moved rather than a variable load. Of course, the solenoid may be located directly beneath the heating device to provide simple linear up-and-down motion, if so preferred, instead of the pivoting action illustrated.

In addition, as shown in FIGURE 4 of the drawings, which illustrates the second embodiment of my invention, the object of my invention may be obtained without the use of a solenoid or an equivalent energy-supplying device. In FIGURE 4, wherein the same numerals as in FIGURES 1, 2 and 3 are used to illustrate like parts, the manual control knob 22 is positioned at the front 31 of the surface section 1. In addition to operating the various parts of mechanism 21, knob 22 is directly connected to a shaft extension 32; in other words, there is a direct connection through the structure 21 from knob 22 to shaft extension 32.

At the end of shaft 32 there is provided a cam 33 of heat-resistant material. Cam 33 is of an appropriate shape so that in all positions of knob 22 which call for heating of the heating unit, the cam serves to raise the end 34 of the heating unit. This causes pivoting of the heating unit around pivot pin 11, and the shape of the cam is such as to push the heating unit up until the surface 4 is horizontally flat against the bottom of the cooking vessel 3. When it is desired to shut off the heat, the movement of knob 22 to the off position causes cam 32 to rotate; the cam is conventionally shaped with a "dwell" at the off position, so as to permit the heating unit to pivot down to the position shown. In this position surface 4 is out of contact with the bottom of vessel 3.

It can readily be seen that instead of a special mechanical or electrical energy-supplying device, the energy is supplied by the user by operation of control knob 22. It will further be seen that very little energy is required since the heating unit itself represents very little weight, and since it is already supported at pivot point 11 so that only one end thereof is being moved up and down.

While in accordance with the patent statutes I have described what at present is considered to be the preferred embodiment of my invention, it will be obvious to those skilled in the art that various changes and modifications may be made therein without departing from the invention. Thus, it is aimed in the appended claims to cover all such equivalent variations as fall within the true spirit and scope of my invention.

What I claim as new and desire to secure by Letters Patent of the United States is:

1. A surface heating device comprising:
   (a) means providing a generally flat upper surface intended to contact a cooking vessel for heating primarily by conduction;
   (b) independent support means extending up for supporting the vessel, said flat upper surface having openings through which pass the independent support means;
   (c) means for causing heating of said upper surface;
   (d) an on-off system for controlling operation of said heating means; and
   (e) means responsive to said on-off system for raising and lowering said upper surface a relatively small distance in the "on" and "off" conditions respectively of said on-off system;
      (i) said raising and lowering means raising said upper surface so that it is against the bottom of a vessel supported on said independent support means;
      (ii) said raising and lowering means lowering said upper surface so that it is spaced from a vessel supported on said independent support means and cannot transfer heat thereto by conduction.

2. The device defined in claim 1 wherein said independent means include at least three upwardly extending spaced support members having their tops substantially in a horizontal plane.

3. The device defined in claim 1 wherein said means for raising and lowering said upper surface comprises a solenoid secured to said upper surface in moving relation thereto.

4. The device defined in claim 3 wherein said upper surface is in its lowered position when said solenoid is deenergized and said upper surface is in its raised position when said solenoid is energized.

5. The device defined in claim 1 wherein said on-off system is manually controlled and includes a manually operable member, and said raising and lowering means is mechanically connected to said manually operable member so as to be operated thereby.

6. The device defined in claim 5 wherein a cam member is connected to said manually operable member, said cam means being positioned to cause up and down motion of said upper surface.

References Cited

UNITED STATES PATENTS 1,102,392   7/1914   Denhard _____ 219—456

BERNARD A. GILHEANY, *Primary Examiner.*

F. E. BELL, *Assistant Examiner.*